(No Model.)
J. HOLLAND.
MECHANISM FOR CARRYING TROLLEY WHEELS UNDERGROUND.
No. 451,691. Patented May 5, 1891.
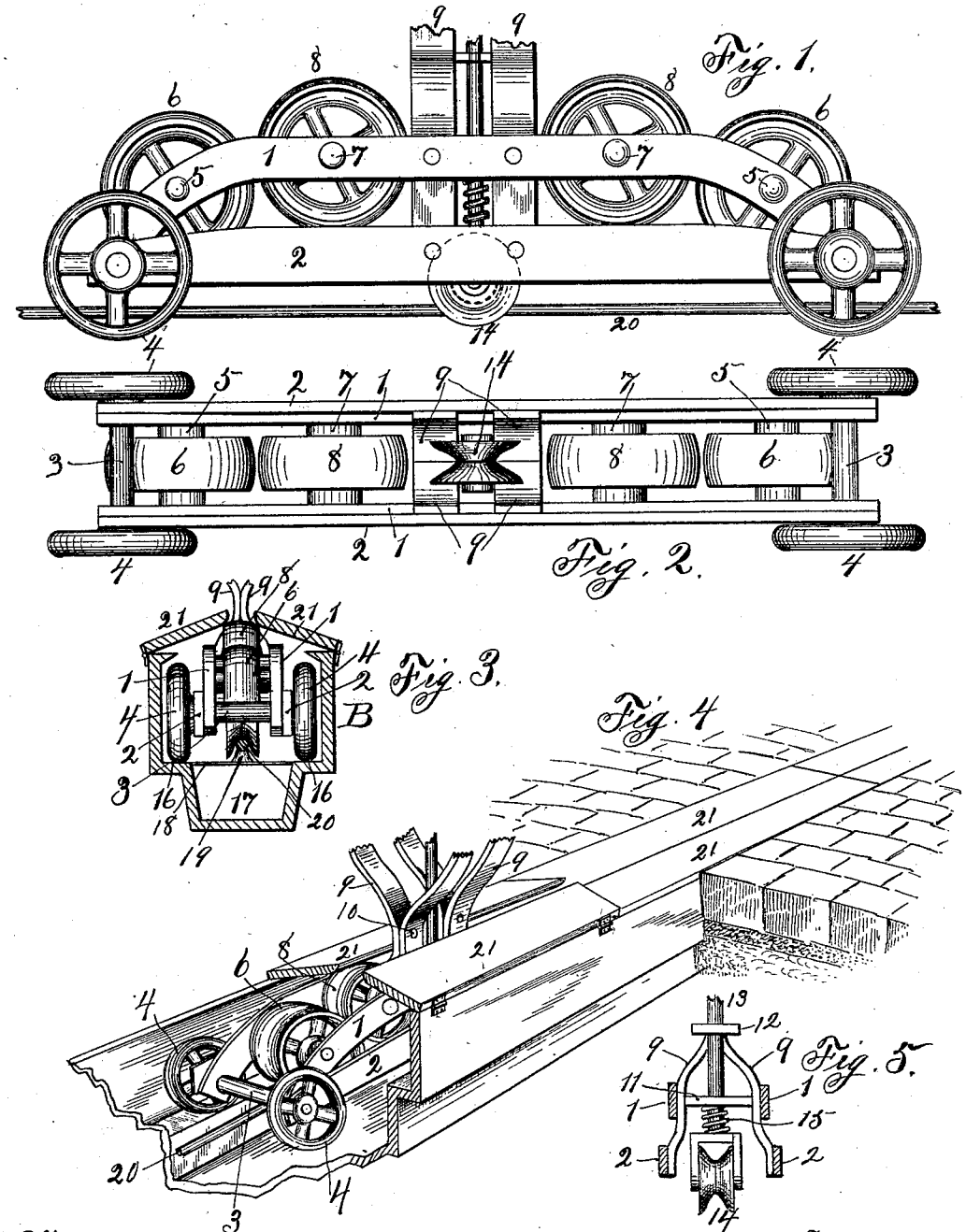
Witnesses
H. A. Carhart
E. V. Mack
Inventor
Joseph Holland
By his Attorneys
Smith & Denison

UNITED STATES PATENT OFFICE.

JOSEPH HOLLAND, OF WATERTOWN, NEW YORK.

MECHANISM FOR CARRYING TROLLEY-WHEELS UNDERGROUND.

SPECIFICATION forming part of Letters Patent No. 451,691, dated May 5, 1891.

Application filed December 22, 1890. Serial No. 375,413. (No model.)

*To all whom it may concern:*

Be it known that I, JOSEPH HOLLAND, of Watertown, in the county of Jefferson, in the State of New York, have invented new and useful Improvements in Mechanism for Carrying Trolley-Wheels Underground, of which the following, taken in connection with the accompanying drawings, is a full, clear, and exact description.

My invention relates to mechanisms for carrying a trolley-wheel in proper contact with an electric wire laid in a conduit in the ground between the rails of a railway-track, and to means for opening the top of the conduit automatically as the car travels along the track, such operation being performed in advance of the trolley, and the conduit being automatically closed behind the trolley.

My object is to produce a truck adapted to travel in a conduit in the street between the rails of a railway and adapted to carry a trolley in proper contact with a wire laid in the conduit, said conduit being provided also with doors normally closing its top, and said truck being also provided with means to automatically open said doors successively in advance of the trolley, and release them behind the trolley, so that they close themselves, said truck being connected to the car, and the movement of the car on the track causes the truck to travel in the conduit along with the car, said trolley being automatically and vertically adjustable and at all times in yielding contact with wire and adapted to follow it through all of the sags and over the rises of said wire incident to its mounting in the conduit and its supports therein.

My invention consists in the several novel features of construction and operation hereinafter described, and which are specifically set forth in the claims hereunto annexed.

It is constructed as follows, reference being had to the accompanying drawings, in which—

Figure 1 is a side elevation of the truck, the wire, and the trolley detached from the conduit. Fig. 2 is a bottom plan of the truck and trolley. Fig. 3 is an end elevation of the parts shown in Fig. 1 inclosed in the conduit. Fig. 4 is an isometrical elevation of the truck partly in the conduit, showing the doors open for the passage between them of the trolley-arm and the bars connecting the truck to the car. Fig. 5 is a sectional elevation of the truck-frame on a vertical transverse line adjacent to the front or rear side of the trolley and showing the support for its arm in the truck-frame or in the bars connecting it to the car.

The truck-frame consists of trusses 1 and truss-chords 2, secured together and mounted upon the axles 3, upon which the supporting-wheels 4 are mounted or journaled. The parallel trusses are also connected by the arbors 5, upon which the rollers 6 are mounted, and by the arbors 7, upon which the rollers 8 are mounted, the rollers 6 lying in one horizontal plane and the rollers 8 in another plane above that of the rollers 6.

The connecting-bars 9 are secured to both the chords until they meet and are secured together, as at 10, Fig. 4, above which they diverge and are connected to the car truck or body, as desired. A cross-bar 11, between them, braces these connecting-bars. This cross-bar 11 and the upper bar 12 together act as guides for the trolley-arm 13, which passes loosely through them, and 14 is the trolley-wheel journaled in suitable bearings, as shown, and 15 is a coiled spring around said arm and which bears downward upon the wheel, thus permitting the trolley-wheel to follow all of the undulations of the wire, always in electrical contact therewith.

B is the conduit, consisting of a long trough set into the ground and provided with the longitudinal side ledges or shelves 16, which form the trackway for the truck-wheels, and is further provided with a longitudinal depression 17 to catch dirt, &c. Across this depression and between the shelves I secure at intervals the cross wires or bands 18, Fig. 3, which support the insulating-blocks 19, upon which the electric wire 20 is supported. The top of the conduit is closed by the sectional doors 21 meeting each other when closed, and thus preventing snow, dirt, and filth from entering the conduit.

When in use, the rollers 6, which are then in front, operate to open the doors part way, and then the rollers 8, following, raise them until they are wide open, and then the trolley-arms and connecting-bars will pass freely between them. As they so pass through, the other rollers 8, following, pass under and support the doors, which then fall onto the rollers 6, following behind, and next the doors fall to substantially a horizontal, all as shown in Fig. 4, in which two of the doors are shown as supported upon the rollers 8, both in front and in rear of the trolley-arm.

It will be seen that this system does away with all overhead wires and all poles to support them, and with all of the evils, inconvenience, and disadvantage connected therewith, obtaining and maintaining as perfect insulation of the wire and all danger of injury to man or beast from contact with the wire, and that the conduit is normally closed tightly and is opened automatically by the travel of the truck therein and automatically closes behind it, so that it is only open under the car. These doors are hinged or otherwise connected to the top of the side walls of the conduit-trough. It will be further seen that the external longitudinal projection on each side of the conduit affords a lateral support for the conduit and each side thereof.

I do not limit myself to the use of the tight doors shown, for I can use a slot like that used in the conduit of a cable railway; nor do I, accordingly, limit myself to the use of the rollers 6 and 8, as they would be unnecessary in case I use an open slot in the top of the conduit.

What I claim as my invention, and desire to secure by Letters Patent, is—

1. The combination, with the conduit-body and the side trackway-shelves therein, of transverse supports between said shelves, insulating-blocks mounted upon said supports, and an electric wire carried by said insulating-blocks.

2. The combination, with the conduit-body, the side trackway-shelves therein, the transverse supports between said shelves, the insulating-blocks mounted upon said supports, and the electric wire carried by said insulating-blocks, of a truck having wheels traversing said trackway-shelves, a trolley-wheel carried by said truck in yielding contact with said wire, and means to connect said trucks and trolley-arms to a motor-car.

3. The combination, with the conduit and its sectional cover, the side trackway-shelves therein, the transverse supports between said shelves, the insulating-blocks mounted upon said supports, and the electric wire carried by said insulating-blocks, of a truck having wheels traversing said trackway-shelves, a trolley-wheel carried by said truck in yielding contact with said wire, graded wheels on both ends of said truck engaging with said cover, sections to raise and lower them, and means to connect said truck and trolley-arm to a motor-car.

In witness whereof I have hereunto set my hand on this 13th day of December, 1890.

JOSEPH HOLLAND.

In presence of—
H. P. DENISON,
E. V. MACK.